W. A. LORENZ.
GASKET AND ITS MANUFACTURE.
APPLICATION FILED APR. 24, 1908.

930,297.

Patented Aug. 3, 1909.

Witnesses:
H. Mallner
Caroline M. Breckle

Inventor
William A. Lorenz
By W. H. Honiss, Atty.

UNITED STATES PATENT OFFICE.

WILLIAM A. LORENZ, OF HARTFORD, CONNECTICUT, ASSIGNOR OF ONE-HALF TO BEECH-NUT PACKING COMPANY, OF CANAJOHARIE, NEW YORK, A CORPORATION OF NEW YORK, AND ONE-FOURTH TO WILLIAM H. HONISS, OF HARTFORD, CONNECTICUT.

GASKET AND ITS MANUFACTURE.

No. 930,297.      Specification of Letters Patent.      Patented Aug. 3, 1909.

Original application filed November 30, 1906, Serial No. 345,623. Divided and this application filed April 24, 1908.
Serial No. 428,972.

*To all whom it may concern:*

Be it known that I, WILLIAM A. LORENZ, a citizen of the United States, and resident of Hartford, in the county of Hartford and State of Connecticut, have invented certain new and useful Improvements in Gaskets and Their Manufacture, of which the following is a full, clear, and exact specification.

This invention consists in an improved gasket for hermetic closures, and in an improved method of manufacturing the said gaskets. These are illustrated in the accompanying drawings, in which—

Figure 1 is a sectional view, showing the improved gaskets, and a tube from which, according to the present invention, they may be manufactured, a mandrel and knives being shown in illustration of the improved method of manufacture. Figs. 2 and 3 are sectional views, showing two of the severed gaskets of Fig. 1, either of which may be reversed so as to conform to the other. Fig. 4 is an end view of the gaskets of Figs. 2 and 3. Figs. 5 and 6 are side elevations illustrating the use of the gasket, in a jar closure, Fig. 5 showing the gasket placed in position upon a shouldered jar, while Fig. 6 shows in addition to what is shown in Fig. 5, a tapering or flaring cap placed in sealing position upon the gasket.

This application is a division of my prior application Serial No. 345,623, filed November 30, 1906, in which I have shown and described the form of gasket shown herein, in connection with other and related forms of gasket; and have more broadly claimed the process of making the different forms of gasket shown therein, including the specific form which is the subject matter of the present application.

The forms of gasket shown in the drawings are well adapted for use in the hermetic sealing of jars and other vacuum receptacles, particularly in connection with what are known as wedging closures, being applied thereto as illustrated in Figs. 5 and 6. The gasket after being placed upon the jar 38, or other receptacle, as shown in Fig. 5, is compressed at an angle against its sealing seat on the jar, by means of a tapering or flaring cap as shown in Fig. 6. The two sides 13 and 14 of the gasket, which are at substantially right angles with each other, rest against the seat, while the tapering or flaring flange 36 of the cap 37 approximately conforms to the oblique or inclined side 15 of the gasket, and upon being forced down makes a tight closure joint between the cap and the jar by compressing the gasket downwardly and inwardly against its seat upon the jar. This triangular form of gasket can be expeditiously manufactured by the improved method shown and described herein, from cylindrical tubing. According to this method the alternate rings are of reversed contour, which may be employed for different forms of closures; or by the reversal of either of the alternate forms as contemplated in this invention, they may be brought into conformity with each other; and all without any waste of the gasket material.

This improved process consists in separating the rings from a tube of gasket material by a succession of circumferential cuts, differing in angular relation to the longitudinal center of the tube to form rings, the cross-sectional contour of which is a right angle triangle.

As a further development of the invention, I preferably make the alternate rings of reversed contour, and reverse one or the other of the alternate rings to bring them all into uniform contour when such uniformity is desired. Or the two forms of gaskets thus produced may be proportioned and used for different forms of closure joints.

The cross-sections of the gaskets C and D are approximately right angled triangles, reversed relative to each other. The gasket D is separated from the tube by the cutting tool 35, and its counterpart gasket C is severed from the tube by the cutter 34. The material of which these gaskets are commonly made is rubber or other flexible material, so that either of the gaskets C or D may be reversed by turning it inside-out; and when thus reversed becomes exactly like the other gasket. In other words, the gasket C of Fig. 2 when thus reversed is exactly like the gasket D of Fig. 3; and the latter, if reversed, is exactly like the gasket C. Therefore, after the tube is thus cut up into these two forms of rings they may be used for different closures, or they may be brought into conformity with each other by reversing the alternate rings of either form, according to the form desired.

The tube 27 of which these gaskets are to be made is or should be of approximately the same outer and inner dimensions as the desired diameters of the gaskets, and is mounted for rotation on an axis coincident with its longitudinal center, as for example, upon the mandrel 28. The tube may be stretched over the mandrel, so as to hold itself thereon by constriction; or it may be held thereon in any convenient way.

The cutters 34 and 35 are mounted to penetrate the tube 27 at suitable intervals along the length of the tube, those intervals being in accordance with the desired lengths of the gaskets. The inclined cutter 35 is moved inwardly through the wall of the tube toward the axis of the mandrel at the same angle to that axis as the desired angle of the inclined side of the gaskets, while the cutter 34 is moved through the said wall at right angles with that axis. The cutters are moved along the mandrel, or the mandrel is moved longitudinally past the cutters between the successive operations of the cutters. Or, if preferred, both cuts may be made with one cutter, the angle of which is alternated or otherwise properly varied between the successive cuts. These cutting tools may be held in the operator's hands and pushed through the walls of the rotating tube alternately in the lines of the desired cuts, which as shown in the drawings are in line with the positions of the tools themselves; or the tools may be mounted upon slides which are movable in the direction of the cut and adjustable to the different angles that may be required. These tools may be also mounted so as to swing in the arc of a circle, with the blades curved in substantial conformity with that arc, as shown in U. S. Patent No. 826,104, granted to William H. Honiss July 17, 1906, and particularly in Fig. 8 thereof, the position of the center of swing and the radius of the arc being adapted to the different angles or curvatures of the desired cuts. Or the cutters 34 and 35 may be mounted to revolve around the stationary tube and be fed inwardly so as to penetrate the wall of the tube at the desired angle and in the required succession.

Many modifications may be made in the proportions and angular relation of the cuts in manufacturing gaskets by this method. The inclined surface may be made at different inclinations to the axis of the gasket. In various ways which will suggest themselves to those skilled in this art this improved method may be modified to conform to different conditions, or to suit the tools or apparatus that may be best available for or adaptable to the work.

The form of closure shown in Figs. 5 and 6 of the drawings is shown, described and claimed in another copending application, Serial No. 428,973, filed contemporaneously herewith, also as a division of my aforesaid prior application Serial No. 345,623.

I claim as my invention:—

1. The process of making triangular shaped gaskets or sealing rings from a tube of yieldable material, which consists in revolving the tube and severing the gaskets or rings therefrom by traversing straight cuts and traversing diagonal cuts through the wall of the revolving tube at the required intervals, for the cuts to form a gasket having a straight plane side face, a straight plane bottom face, a diagonal side face with a lower right angle, a lower acute angle corner and an upper acute corner, substantially as described.

2. The process of making triangular shaped closure gaskets or sealing rings, which consists in dividing two gaskets or rings from a tube of yieldable material by a straight line circumferential cut and a diagonal line circumferential cut, both cuts penetrating the wall of the tube, one at a right angle and the other at an acute angle to the longitudinal center of the tube, substantially as described.

3. A closure gasket or sealing ring of compressible and yieldable material and having a straight plane inner face, a straight plane bottom face, and a diagonal outer face, with a lower right angle corner, a lower acute angle corner and an upper acute angle corner, joining the three faces, substantially as described.

4. The process of making ring gaskets from a tube of gasket material, which consists in separating the rings from the tube by circumferential cuts through the wall of the tube, comprising cuts made at an acute angle with the axis of the tube, alternating with cuts made substantially at right angles to that axis.

5. The process of making ring gaskets from a tube of gasket material, which consists in separating the rings from the tube by circumferential cuts through the wall of the tube, comprising cuts made at an acute angle with the axis of the tube, alternating with cuts made substantially at right angles to that axis, to form the alternate rings of reverse contour, and then reversing the alternate rings to bring them all to substantially uniform contour.

6. The process of making ring gaskets having a right angled triangular cross-section from a tube of gasket material, which consists in rotating the tube upon its longitudinal center as an axis and cutting the rings therefrom by penetrating the wall of the rotating tube with a cutting tool at the desired intervals, and in alternately differing angular relation to the longitudinal center of the tube, the alternate cuts being made at an acute angle, and at a right angle, respectively, to that center.

7. The process of making ring gaskets having a right angled triangular cross-section from a tube of gasket material, which consists in rotating the tube upon its longitudinal center as an axis, and cutting rings therefrom by penetrating the wall of the rotating tube with a cutting tool, at an acute angle with the axis of the tube, alternating with cuts made substantially at right angles to that axis to form the alternate rings of reverse contour, and then reversing the alternate rings to bring them all to substantially uniform contour.

8. The process of making triangular shaped gaskets or sealing rings from a tube of yieldable material, which consists in revolving the tube and severing each gasket or ring therefrom by a traversing straight cut and a traversing diagonal cut through the wall of the revolving tube at the required intervals, for the cuts to form a gasket having a straight plane side face, a straight bottom face, a diagonal side face with a lower right angle, a lower acute angle corner and an upper acute angle corner, and then reversing the alternate gaskets or rings to bring them all to substantially uniform contour.

9. The process of making triangular shaped closure gaskets or sealing rings, which consists in dividing two gaskets or rings from a tube of yieldable material by a straight line circumferential cut and a diagonal line circumferential cut, both cuts penetrating the wall of the tube, one at a right angle and the other at an acute angle to the longitudinal center of the tube, and then reversing the alternate gaskets or rings to bring them all to substantially uniform contour.

In testimony whereof I have signed my name to this specification in the presence of two subscribing witnesses.

WILLIAM A. LORENZ.

Witnesses:
   HANS MALLNER,
   EDWARD H. LORENZ.